United States Patent [19]

Krocker

[11] 4,446,913
[45] May 8, 1984

[54] AUTO CHANGEOVER THERMOSTAT WITH MEANS FOR HANDLING TEMPERATURE ENTRY ERRORS

[75] Inventor: Robert E. Krocker, Stoddard, Wis.

[73] Assignee: The Trane Company, La Crosse, Wis.

[21] Appl. No.: 510,493

[22] Filed: Jul. 5, 1983

[51] Int. Cl.³ .............................. F25B 29/00
[52] U.S. Cl. ................... 165/12; 236/46 R; 364/557
[58] Field of Search .......... 165/12, 11 R, 261; 236/46 R; 364/557, 505

[56] References Cited

U.S. PATENT DOCUMENTS

| | | | |
|---|---|---|---|
| 2,558,610 | 6/1951 | Diekhoff | 165/12 |
| 4,200,910 | 4/1980 | Hall | 165/11 |
| 4,314,665 | 2/1982 | Levine | 165/12 |
| 4,316,256 | 2/1982 | Hendricks et al. | 236/46 R |
| 4,373,351 | 2/1983 | Stamp, Jr. et al. | 236/46 R |

FOREIGN PATENT DOCUMENTS 56-162340 12/1981 Japan ................. 165/11 R

Primary Examiner—Allen M. Ostrager
Assistant Examiner—Stephen F. Husar
Attorney, Agent, or Firm—Carl M. Lewis; Ronald M. Anderson; Raymond W. Campbell

[57] ABSTRACT

A thermostat used to control a temperature conditioning system to heat or cool a comfort zone to a heating setpoint and a cooling setpoint. The thermostat is microcomputer based and includes both a digital keypad and display for setpoint entry by an operator. Control means in the thermostat automatically insure that at least a predetermined minimum offset is maintained between the heating and cooling setpoints stored in memory, and the control means are further operative to adjust one of the setpoints if the operator enters a value for the other setpoint that is in error.

9 Claims, 4 Drawing Figures

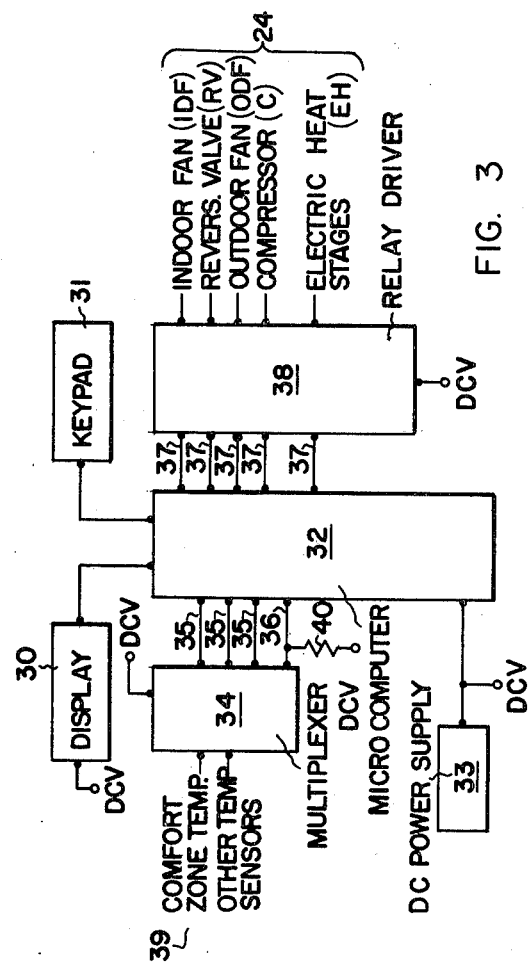
FIG. 3
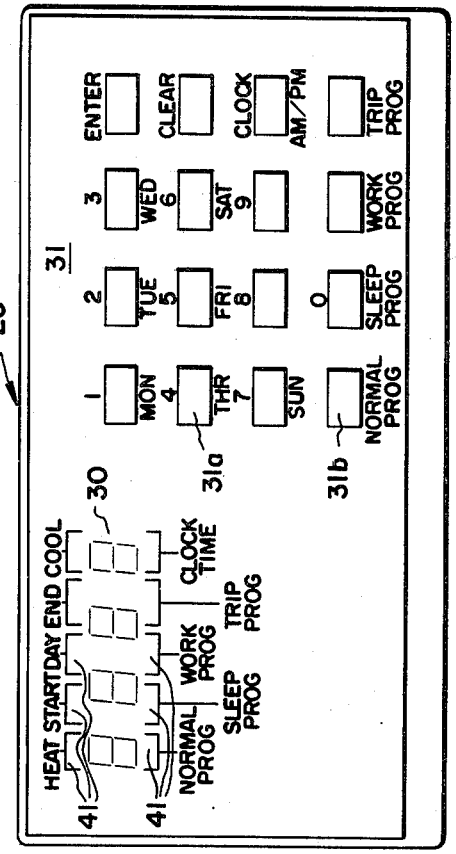
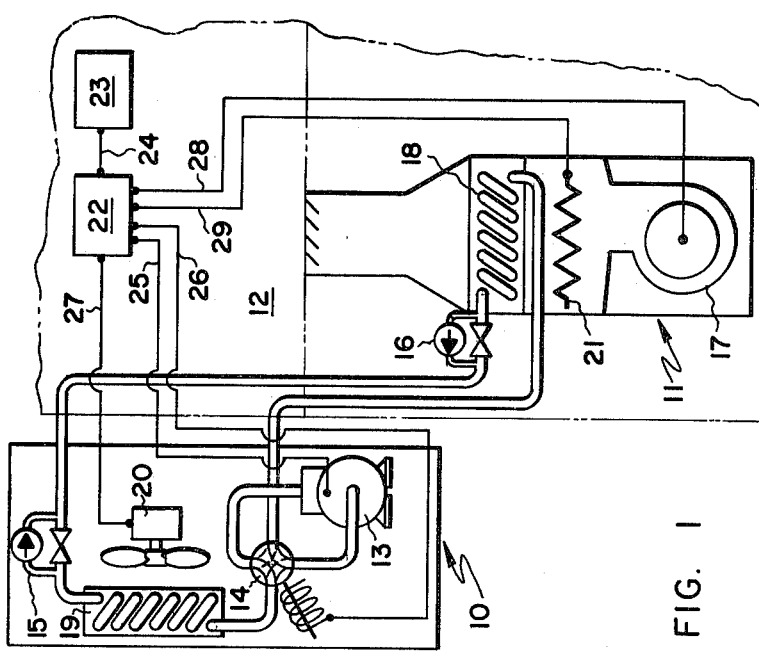
FIG. 2
FIG. 1

AUTO CHANGEOVER THERMOSTAT WITH MEANS FOR HANDLING TEMPERATURE ENTRY ERRORS

DESCRIPTION

1. Technical Field

This invention generally pertains to a thermostat for controlling a temperature conditioning system, and specifically to an auto changeover thermostat for controlling heating and cooling in accordance with operator entered heating and cooling setpoints.

2. Background Art

A temperature conditioning system capable of both heating and cooling a comfort zone may be controlled by a thermostat that includes a manual switch for selecting the mode of operation. Such a device requires only a single temperature setpoint that may be set to different values when the control mode is manually changed.

Alternatively, a thermostat may be equipped with means for automatically changing between the heating and cooling modes in response to the deviation of the zone temperature from an upper and lower temperature setpoint. If the zone temperature is less than the heating setpoint, the thermostat energizes the temperature conditioning system in a heating mode; and conversely, if the zone temperature is warmer than the cooling setpoint, the thermostat effects operation of the system in the cooling mode. To avoid excessive cycling of the system between cooling and heating, most conventional auto changeover thermostats include a mechanical stop to prevent levers used for adjusting the setpoints from being positioned with too little differential or offset between the setpoints. It is desirable to maintain at least a 4°-5° F. deadband between these setpoints to avoid unnecessary cycling between modes and resulting high energy consumption. Moreover, the mechanical stop used in such conventional thermostats insures that the heating and cooling setpoints do not cross-over, i.e., that the cooling setpoint is always higher in temperature than the heating setpoint.

In a digital thermostat using a keypad for entry of setpoints into memory, mechanical means for preventing setpoint entry errors are inappropriate. Digital thermostats typically alert the operator if he has entered an incorrect heating or cooling setpoint by flashing an "error" message. The operator may then enter corrected values. In other digital auto changeover thermostats, the entry of a setpoint is accomplished with controls that cause the displayed temperature to slew either upward or downward in value. Since only one setpoint is usually displayed at a time, it is possible to overlook a significant change in relationship between the heating and cooling setpoints, such as cross-over, unless some means is used to alert the operator of the condition.

In the event that an operator enters an incorrect setpoint using either a digital keypad or a slewing control for input, it would be desirable for the control to automatically adjust the other setpoint so as to maintain at least the minimum desired offset. Should this occur, however, the control should clearly indicate that such a change has occurred.

It is therefore an object of this invention to provide a digital heating/cooling auto changeover thermostat that automatically maintains a minimum deadband between the heating and cooling setpoints.

Another object of this invention is to provide such a thermostat wherein the heating setpoint is never allowed to exceed the cooling setpoint.

A further object of this invention is that the thermostat automatically adjust one of the setpoints to maintain a minimum deadband if the operator enters a value for the other setpoint that would otherwise cause the deadband to be less than the required minimum.

A still further object is that the thermostat alert the operator to an automatically adjusted setpoint value by displaying the new value and giving the operator the opportunity to amend the adjusted setpoint or to accept it.

These and other objects of the invention will be apparent from the description of the preferred embodiment contained hereinbelow and by reference to the attached drawings.

SUMMARY OF THE INVENTION

This invention is a thermostat for controlling a temperature conditioning system to selectively heat or cool a comfort zone to a heating or a cooling setpoint, respectively. The thermostat includes a digital keypad with which the operator may enter the setpoint values. Memory means are operative to store setpoint values entered by the operator. Control means connected to the memory means selectively control the temperature conditioning system to the heating or cooling setpoint and automatically maintain at least a predetermined offset between the setpoints.

If the operator enters one of the setpoints on the keypad that would result in less than the desired offset between setpoints, the control adjusts the other setpoint automatically. The thermostat further includes means for displaying the setpoints and thus is able to show the adjusted setpoint to alert the operator to the changed value.

BRIEF DESCRIPTION OF THE DRAWINGS

FIG. 1 is a diagram of a generally conventional heat pump system controlled by a thermostat that includes the subject invention.

FIG. 2 is a plan view of the surface of the thermostat illustrating the layout and disposition of the digital keypad and display.

FIG. 3 is a block diagram of the thermostat control.

DESCRIPTION OF THE PREFERRED EMBODIMENT

Figure 4:
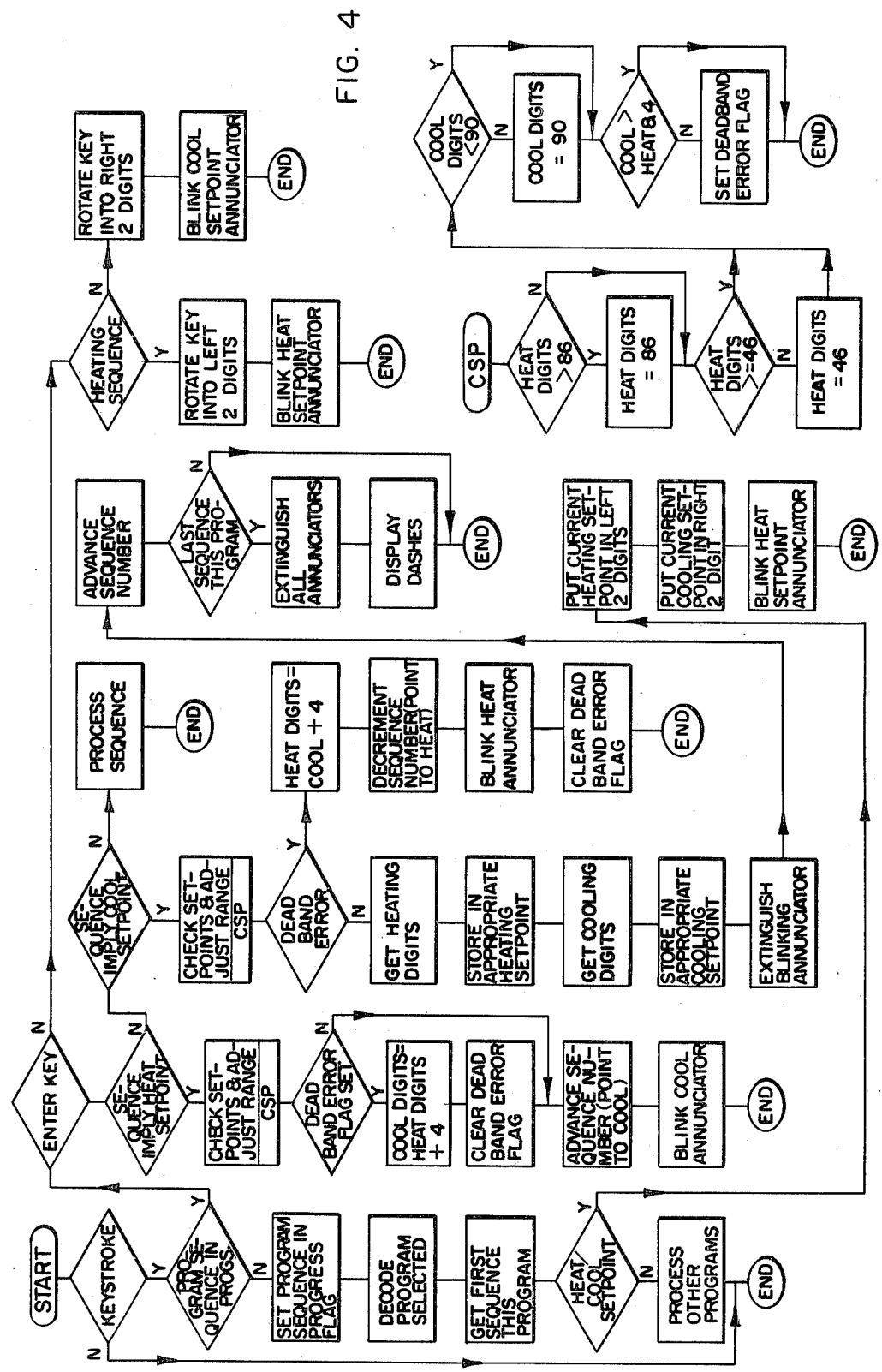
FIG. 4 is a flow chart that sets forth the control logic of the subject invention.

A generally conventional air source heat pump is shown in FIG. 1, and includes an outdoor unit 10 and an indoor unit 11. The heat pump system is shown in a schematic block diagram format, with the indoor unit 10 arranged to provide temperature conditioned air to a comfort zone 12. The heat pump comprises a refrigerant vapor compressor 13, coupled to an electric reversing valve 14, and expansion/bypass valves 15 and 16 are provided such that the heat pump system may be selectively operated either to heat or to cool air circulated through the comfort zone 12 by an indoor fan 17. Further included in the heat pump system are an indoor heat exchanger 18, an outdoor heat exchanger 19, and outdoor fan 20. Electric heating elements 21 are provided as an auxiliary heat source for heating the comfort zone 10 when the outdoor ambient air temperature is relatively low.

During operation in the heating mode, refrigerant vapor is compressed by compressor 13, passes through reversing valve 14 and into the indoor unit 11, where it is condensed in the indoor heat exchanger 18 by heat transfer with air circulated into the comfort zone 12 by indoor fan 17. The condensed refrigerant liquid bypasses through expansion/bypass valve 16 and expands through expansion/bypass valve 15 into the outdoor heat exchanger 19. The outdoor fan 20 moves outdoor ambient air through the outdoor heat exchanger 19 in heat exchange relationship therewith, such that the refrigerant liquid is vaporized as it absorbs heat from the air. The refrigerant vapor thereafter returns through reversing valve 14 to the inlet of compressor 13.

While operating in the heating mode, the capacity and efficiency of an air source heat pump is significantly reduced when the outdoor ambient air temperature is relatively low. It is therefore common practice to supply auxiliary heating stages to supplement the heating capacity of a heat pump under these conditions. In the preferred embodiment, electric heating elements 21 are disposed to heat air circulated into the comfort zone 12 by the indoor fan 17. Although only a single heating element 21 is diagrammatically shown in FIG. 1, it should be considered representative of one or more stages of electric heat, each stage capable of being selectively energized as required to meeting the heating demand.

Air supplied to the comfort zone 12 may also be selectively cooled rather than heated, by operation of reversing valve 14 which interchanges the functions of the indoor and outdoor heat exchangers 18 and 19, respectively. In the cooling mode, the outdoor heat exchanger 19 serves as a condenser to condense the compressed refrigerant vapor supplied by compressor 13. The condensed liquid bypasses through expansion/bypass valve 15 and expands through expansion/bypass valve 16 into the indoor heat exchanger 18. The refrigerant liquid is vaporized in heat transfer relationship with air circulated into the comfort zone 12 by the indoor fan 17, thereby cooling the air. The vaporized refrigerant returns to the compressor 13, to repeat the cycle.

Power is applied to each of the operating elements of the heat pump system from a power source/relay board 22 under the control of a thermostat 23. Thermostat 23 is connected to the power source/relay board 22 by means of a multi-conductor low voltage cable 24. Although the power source/relay board 22 is shown diagrammatically in FIG. 1 as being disposed within the comfort zone 12, it may equally well be disposed within or adjacent to the indoor unit 11. Relay board 22 is supplied with a source of line power, and when selected relays are closed under the control of thermostat 23, line power at the proper voltage level is applied to selected operating components of the heat pump system to energize them. Specifically, compressor 13, reversing valve 14, outdoor fan 20, indoor fan 17, and electric heating stages 21 may be energized by current so controlled, through power supply leads 25-29, respectively.

Referring now to FIG. 3, the thermostat control 23 is seen to include a microcomputer 32 connected to a digital display 30 and digital keypad 31. Thermostat 23 further comprises a multiplexer chip 34 and relay driver 38, with DC power provided at required voltage levels (e.g., +5 VDC) by DC power supply 33. Microcomputer 32 includes a central processing unit (CPU), a read-only memory (ROM), a random-access memory (RAM), an internal timer/counter, and an anlog-to-digital (A-D) converter. In the preferred embodiment, microcomputer 32 is an Intel, type 8022 large scale integrated circuit, specifically selected for its on-chip analog-to-digital conversion capability. A microcomputer without A-D converter, but otherwise similar and an external 8 bit A-D converter chip or discrete circuitry, would be equally suitable for carrying out the subject invention.

The DC power supply 33 is of generally conventional design, and provides a regulated DC voltage to power microcomputer 32 and the other components connected to the DC bus of the thermostat 23. Relay driver 38 is also of conventional design well known to those skilled in the art, and includes solid-state switching to energize selected relay coils on relay board 22, in response to logic level signals from microcomputer 32 transmitted over output logic lines 37.

An analog input signal to microcomputer 32 is selected by logic selector signals output over selector lines 35 which are connected to multiplexor chip 34. Multiplexer 34 receives a digital select code from microcomputer 32 via lines 35, decodes that information, and provides the selected analog signal on line 36, as input to the built-in A-D converter of microcomputer 32. Multiplexer chip 34, in the preferred embodiment, is a Motorola Corporation integrated circuit, type MC 14051; other similar multiplexers would be equally suitable. Analog signals are provided as inputs to the multiplexer chips 34 from various temperature sensors such as thermistors disposed at various points throughout the heat pump system, and from a temperature sensor 39 included within the housing of thermostat 23 and thus disposed within comfort zone 12. The resistance of each of the temperature sensors including comfort zone temperature sensor 39 changes as a function of temperature; a pull-up resistor 40 connected to the DC power supply voltage is connected to analog input line 36 to insure that a DC voltage proportional to the selected temperature is applied to the analog input of microcomputer 32.

FIG. 2 illustrates the external appearance of the front panel of thermostat 23, as viewed by an operator. Display 30 includes four, seven segment vacuum fluorescent (VF) display digits, with five annunicator VF bars 41 on both the top and the bottom of the digital display. Annunicator bars 41 are lighted by the control to prompt the operator in entering data such as setpoints, and to designate the status of the digital data shown on display 30.

Keypad 31 includes 10 numeric keys 31a, "0-9", and six function keys 31b. Since the preferred embodiment of thermostat 23 provides for programming a schedule of desired temperature setpoints to be maintained at selected times on selected days, keypad 31 and display 30 provide means for entering both time and temperature setpoints. These provisions allow an operator to establish heating and cooling setpoints for a normal occupied time period, a sleep time period, and a working period when the comfort zone is unoccupied. In addition, a trip schedule is programmable that permits the heat pump system to be operated at setpoints consistent with an unoccupied comfort zone 12 for a prescribed number of days, and then set up to a normal occupied setpoint prior to the return of the occupants. Since the full operating functions of thermostat 23 need not be explained to fully disclose the operation of the subject invention, most of these features will not be further discussed herein.

A flow chart illustrating the control logic for implementing the error entry functions of thermostat 23 is illustrated in FIG. 4. The flow chart of FIG. 4 may be considered as a subroutine of the control logic machine language instructions stored within the read-only memory (ROM) of microcomputer 32 as a binary code, for implementing control of the heat pump system to maintain the comfort zone 12 at a desired setpoint, and for implementing the other control features of thermostat 23. The purpose of the control logic shown in FIG. 4 is simply to insure that the heating and cooling setpoints entered by an operator differ by a predetermined minimum offset value, and that the cooling setpoint is always higher in value than the heating setpoint. In addition, the control logic of FIG. 4 automatically adjusts one of the setpoints to maintain the required offset if an operator enters an incorrect setpoint. The subroutine is called at milli-second intervals to insure that an entry key stroke by the operator is not overlooked while the mainline program is busy with normal control of the heat pump system.

Starting in the upper left corner of FIG. 4, the program determines if an operator has depressed a key on keypad 31; if not, control is returned to the main line program. However, if a key has been depressed, the program next determines whether a program sequence is in progress. For example, if the first key depressed is "NORMAL PROG" on keypad 31, this would initiate a program sequence, and subsequent key strokes would be interpreted as part of the program sequence. A flag would be set to note that the program sequence is in progress, and a decode program for accepting data input to this function, NORMAL PROGRAM, would be selected from the machine language instructions stored in ROM. The sequence initiated by the normal program key expects the operator to input a heating setpoint, followed by a cooling setpoint. The program also retrieves the current values for heating and cooling setpoint from random access memory (RAM) as noted by the instruction "Get first sequence this program".

If, as is the case under the normal program sequence, the heating and cooling setpoints are the active data input required from the operator, the program places the current heating setpont in the left two digits of display 30 and the cooling setpoint in the right two digits, and causes the heat setpoint annunciator 41 to blink. The blinking heat setpoint annunciator advises the operator that he should either accept the existing heat setpoint value as displayed by pushing the enter key, or enter a new heat setpoint value.

As an example, it will be presumed that the display 30 shows a heating setpoint of 72° in the left two digits and a cooling setpoint of 80° in the right two digits. If the operator wishes to enter a heating setpoint of 78°, his next key stroke would be the most significant digit of this value, "7". Beginning the program again at "Start", the key stroke on "7" would be detected, and since the program sequence is in progress, the program would next ask if the Enter key had been struck. A negative answer to this question causes the program to ask if the heating sequence is in progess, and with an affirmative answer, rotates the value of the key "7" into the left two digits of the display 30, blanking the left-most digit. The heat setpoint annunciator continues to blink to indicate incomplete input. Similarly, when the operator strikes the "8" key to designate the least signfiicant digit of the heating setpoint, the same logic path is followed, resulting in a display showing 78 in the left two digits. The next key stroke would normally be an Enter key, causing the program to branch downward at the point where the logic inquires if the Enter key has been pressed.

The sequence of operation thus far implies that the entry of the heating setpoint is complete; the program next calls up the routine for checking a setpoint and adjusting range, denoted as "CSP" in FIG. 4. The check setpoint routine first checks to see that the heating digits are less than 86° F.—an arbitrary maximum established to insure a reasonable heating setpoint value. Likewise, the program also checks to insure that the heating setpoint is greater than or equal to 46° F. If the heating setpoint is greater than 86° F., it is adjusted to equal 86° F.; and if less than 46° F., it is set to equal 46° F. Subroutine CSP also checks to see that the cooling digits are less than 90° F. and, if not, sets them equal to 90° F. More importantly, it determines whether the cooling setpoint is greater than the heating setpoint, plus 4° and, if not, sets the deadband error flag. In the examples cited, the operator has just entered a heating setpoint of 78° F., with a previous cooling setpoint entry of 80° F. This results in the deadband error flag being set since the new heating setpoint differs from the old cooling setpoint by only two degrees. (The use of a 4° F. minimum deadband is by way of example and is not intended to limit the scope of the invention.)

An exit from subroutine CSP returns to the point in the program where the condition of the deadband error flag is checked immediately following the subroutine call instruction. If this flag is set, the cooling setpoint is adjusted to equal the heating setpoint, plus 4°. Thus, the display automatically changes the cooling setpoint which was previously at 80° to a new setpoint of 82°, providing the required 4° minimum offset between heating and cooling setpoints. Following this, the deadband error flag is cleared and the program sequence is advanced to the cooling setpoint entry. The operator may thus compare the currently entered heating setpoint of 78° with the new cooling setpoint of 82° offered by thermostat 23. The thermostat also causes the cooling annunicator 41 to blink to indicate that cooling setpoint data may be accepted as displayed or a new setpoint entered.

If the operator is willing to accept the adjusted value for the cooling setpoint of 82°, he may either push the enter key, or wait for approximately three minutes, after which an interval timer in microcomputer 32 will time out, causing the new value of 82° to be automatically entered for the cooling setpoint.

If the operator wishes to enter a new value for the cooling setpoint, such as 84° F., he may push the number "8" key on keypad 31 while the cool annunciator 41 is still blinking. The program detects a key stroke, determines that a program sequence is in progress, notes that the enter key was not depressed and that the heating sequence is not in progress, and rotates the "8" key to the right-most digit of the two right-hand digits in display 30. The cool setpoint annunciator 41 continues to blink. On his next key stroke, the operator enters a "4" on keypad 31, which results in the "8" being rotated into the second digit from the right and the 4 being rotated into the right-most digit of the display 30. The next key stroke would normally be an Enter key, which (in the second column of FIG. 4) causes a determination that the sequence is not in the heat setpoint sequence but is in the cooling setpoint sequence and that the subroutine CSP should be called to check the setpoints. With the entry example given, the logic of the CSP routine would not set the deadband flag since more than 4 degrees offset exists between the heating and cooling setpoints. Since the deadband error flag is not set, the currently displayed heating setpoint digits are obtained and stored in the appropriate heating setpoint in random-access memory as are the current cooling setpoint digits. The cooling and heating annunciator lights are extinguished and the program advances to the next data entry point in the sequence.

For the normal program sequence, no further data entry is required, however for the other programming sequences such as sleep program, work program, and trip program, additional data entry is required. Since the normal program requires no further data entry, the last sequence for the program is indicated by the display 30 showing dashes for a period of approximately 3 minutes, until an interval timer counter in microcomputer 32 times out.

As a further illustration of the operation of the control logic, assume that the operator enters a heating point of 78° F. followed by a cooling setpoint of 80° F. Subroutine CSP then detects that the cooling setpoint is not greater than the heating setpoint by four degrees, resulting in the deadband error flag being set. A return from routine CSP from the main subroutine results in the detection of the deadband error flag being set, causing the program to reset the heating setpoint from 78 to 76 to insure a four-degree off-set from the newly entered cooling setpoint of 80. The program then decrements the sequence number thereby backing up one step in the entry sequence resulting in the heat setpoint annunciator starting to blink to advise the operator that the heat setpoint has been adjusted. Once again the operator has the option of accepting the adjusted heating setpoint, or entering a new heating setpoint.

Should the operator walk away from the thermostat 23 before completing a programming sequence, microcomputer 32 responds by assuming that the data keyed into the display is intended as a replacement of the previous value of that setpoint, and after about 3 minutes as determined by the internal timer on microcomputer 32, enters the value on the display into memory as the current setpoint value. Setpoint data not replaced by the operator is either retained in memory, or adjusted as required, to provide the four-degree offset between setpoints and then stored in memory.

Programming of the other functions for which thermostat 23 is capable, such as sleep program and work program, is accomplished in a similar manner, however the program sequence expects additional data to be entered by the operator, including times and days that the setpoints are to be effected. Annunciators 41 are used to indicate the need to input such additional data.

While the present invention has been described with respect to a preferred embodiment, it is to be understood that modifications thereto will become apparent to those skilled in the art, which modifications lie within the scope of the present invention, as defined in the claims which follow:

I claim:

1. A thermostat for controlling a temperture conditioning system to selectively heat or cool a comfort zone to a heating or cooling setpoint, respectively, said thermostat comprising a. a digital keypad including a plurality of keys, each associated with an alphanumeric value;
   b. memory means for storing the heating and cooling setpoints entered by an operator on the digital keypad;
   c. means for displaying the heating and cooling setpoints; and
   d. control means for controlling the temperature conditioning system to selectively condition the comfort zone to the heating or the cooling setpoint, said control means being connected to the digital keypad, the display means and memory means and operative to automatically maintain at least a predetermined offset between the heating and cooling setpoints by adjusting the value of one of the setpoints as the other setpoint is entered by the operator, and displaying the adjusted value to the operator to alert him of the change, so that the adjusted value may either be entered into the memory means or changed by the operator.

2. The thermostat of claim 1 wherein the predetermined offset between the heating setpoint and the cooling setpoint is automatically maintained so that the heating setpoint is less than the cooling setpoint.

3. The thermostat of claim 2 wherein the control means are operative to automatically display the new value of said one setpoint and to automatically enter the new value in memory after a predetermined time period has elapsed unless the operator has already entered the new value or has changed it.

4. A thermostat for controlling a temperature conditioning system to selectively heat or cool a comfort zone to a heating or cooling setpoint, respectively, said thermostat comprising a. data entry means for entering the heating and the cooling setpoints;
   b. memory means for storing the heating and cooling setpoints entered on the data entry means;
   c. a temperature sensor disposed in the comfort zone;
   d. means for displaying the heating and cooling setpoints in digital format; and
   e. control means electrically connected to the data entry means, memory means, temperature sensor, and display means for controlling the temperature conditioning system to heat the comfort zone if the temperature therein is less than the heating setpoint and to cool the comfort zone if the temperature therein is greater than the cooling setpoint, said control means being operative to automatically adjust one of the heating and cooling setpoints from a previously stored old value to a new value if the operator enters into the memory means the other of the heating and cooling setpoints which differs by less than a predetermined offset from the old value of the one setpoint previously stored in the memory means, and further operative to display the new value on the display means to alert the operator so that he may enter it in the memory means or change it.

5. The thermostat of claim 4 wherein said new value of the one setpoint differs by the predetermined offset from the other value entered by the operator, and the new value is automatically stored in the memory means after a predetermined time period has elapsed unless the operator has already entered it or had changed it.

6. The thermostat of claim 4 further comprising display means for simultaneously displaying both the heating and cooling setpoints, and including means for indicating the entry into the memory means of the heating and cooling setpoints.

7. A thermostat for controlling a temperature conditioning system to selectively heat or cool a comfort zone to a heating or cooling setpoint, respectively, said thermostat comprising
   a. data entry means for entering the heating and the cooling setpoints and other data in a programmed sequence;
   b. random access memory means for storing the heating and cooling setpoints and other data entered on the data entry means;
   c. a temperature sensor disposed in the comfort zone;
   d. display means for displaying data, including data stored in the random access memory means, and data entered on the data entry means; and
   e. control means, electrically connected to the data entry means, the random access memory means, the display means, and the temperature sensor, for controlling the temperature conditioning system in an auto changeover mode, in which the control means cause the temperature conditioning system to heat the comfort zone when the temperature therein is less than the heating setpoint, and to cool the comfort zone when the temperature therein is greater than the cooling setpoint, said control means being further operative to automatically cause the display means to display an adjusted new value for one of the heating and cooling setpoints if an operator enters the other of the heating and cooling setpoints which differs from an old value for the one setpoint by less than a predetermined offset, said adjusted value being different from the other of the heating and cooling setpoints by the predetermined offset whereby the operator is alerted to the new value and given the opportunity to enter the new value into the random access memory means or to change it.

8. The thermostat of claim 7 wherein the display means include at least four digits, two of which are used to show the cooling setpoint, and two, the heating setpoint.

9. The thermostat of claim 7 wherein the control means are further operative to accept only cooling setpoints less than a predetermined maximum and heating setpoints greater than a predetermined minimum.

* * * * *